INVENTORS
Arpad Nadai and
Michael J. Manjoine.
BY
Paul E. Friedemann
ATTORNEY

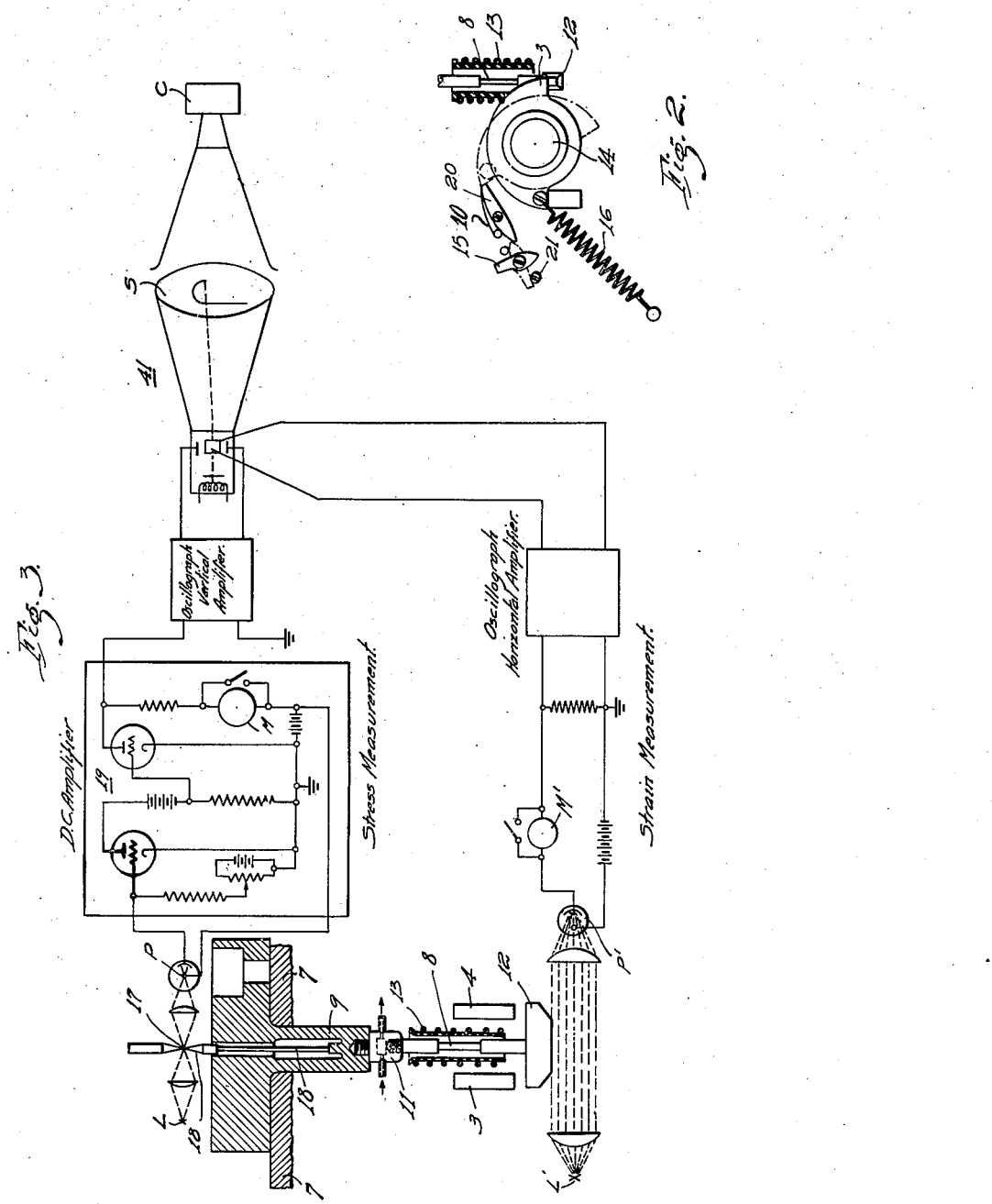

UNITED STATES PATENT OFFICE 2,323,724

HIGH VELOCITY TENSILE MACHINERY

Arpad Nadai, Forest Hills, and Michael J. Manjoine, Wilkinsburg, Pa., assignors to Westinghouse Electric & Manufacturing Company, East Pittsburgh, Pa., a corporation of Pennsylvania Application July 12, 1940, Serial No. 345,098

12 Claims. (Cl. 265—13)

Our invention relates to a machine which is useful as a high-speed tensile machine or a high-speed impact machine or the like, together with a measuring and recording system for obtaining stress-strain characteristics or the like with regard to a changing force (gas pressure) either with reference to time or as a function of displacement (motion of a diaphragm or a piston, indicator diagram of a reciprocating engine).

In continuous hot and cold rolling mills, wide sheets of steel are rolled under high velocities. Rolling speeds of 100 to 1800 feet per minute and more are used. Practically little is known about the forces required for the pure plastic forming of steel and of other ductile metals at the high straining velocities which are used for rolling of sheets or bars or for drawing of rods and wires from atmospheric temperature up to forging temperatures.

Deformation or strain rates of the order of 100–500 per second have been realized in these rapid forming processes, although in many cases the true linear rates of stretching in rolling or drawing may be somewhat less. A strain rate is a strain divided by a time. A strain rate of 100 per second states that the original length of a tensile bar would be increased one hundred times per second or by one tenth of its original length in one thousandth of a second. It is of considerable general interest to investigate the laws of deformation of some of the ductile metals under these conditions up to the range of the hot forming (forging) temperatures. In high-speed tensile tests, strain rates of especial interest vary from 100 to 1000 per second or even more. The fastest rates in these tests are two to three times larger than those encountered in rolling or drawing operations.

It is highly instructive to compare with these fast rates the other extreme range of deformation rates, in which engineers are also quite interested in certain engineering applications. In steam turbines, for example, machine parts are subjected to prolonged loading and to continuous heat and must be designed so that very slow rates of deformation are prescribed. For example, the permissible "creep" may be one-tenth of one percent strain in 100,000 hours (corresponding to 11 years' service). This would correspond to a "creep rate" of $10^{-8}$ per hour or to a strain rate $= 2.8$ times $10^{-12}$ per second. The fastest rates of the deformation which were just mentioned are $3.6 \times 10^{14}$ times the slow rates.

These figures illustrate the enormous range of the order of $10^{14}$ over which the rate of strain may vary in different applications in engineering practice. We do not know of any other engineering problem in which one of the physical variables would have to be considered over such a wide range of its possible values.

For testing the behavior of metals at high velocities, originally, torsion tests were planned with hollow specimens of a comparatively short length. Preliminary tests, however, indicated that it was difficult to prevent plastic buckling of the short tubes and the torsion tests were abandoned in favor of rapid tensile tests. Pendulums and dropping weights have been used in the past for impact and tension tests, however, there is a definite limit as to the speed of such weight and force available which makes it unsuitable for developing large velocities of the weights.

Systems employing variable resistors and piezocrystals have also been used in the past, but these have been found to be unsatisfactory for higher velocities of the hammer. Variable resistors are affected by changes in temperature, hence their calibration is not maintained throughout the entire operation of the machine. Piezocrystal devices have the outstanding disadvantage that they are difficult to calibrate. They are quite sensitive to shocks and to temperature changes, hence such method is found unsatisfactory for high-speed tensile or impact testing particularly in high temperature tests.

The behavior of the ductile metals under very rapidly increasing or impact loads has been the subject of many investigations. In the latter part of the nineteenth century, the notched bar tests in bending were introduced for studying the resistance of the metals to impact and since then a large engineering literature has developed on this subject. Many other devices have been used but we found that they had the outstanding disadvantage of inherently possessing mechanical inertia which had the effect of introducing errors in the readings or related to extremely complicated states of these such as are present in a notched bar when it fails in an impact test.

An object of our invention is to provide a high-speed tensile machine which is suitable for measuring either the tensile force of a specimen under tension or the stress-strain characteristics thereof in a simple but highly reliable manner at any temperature up to the melting point of the metal to be tested.

Another object of our invention is to provide a force measuring device which is relatively free from the effects of shocks and temperature changes, hence which is inherently able to remain calibrated throughout the entire operation thereof.

Another object of our invention is to provide a tensile machine in which the specimen may be readily submitted to extremely high temperatures, that is, up to the melting point of the specimen in a very short period of time, for example, in a period of seconds or at most, one or two minutes for certain tests.

Other objects and advantages will become more apparent from a study of the following specification when considered in conjunction with the accompanying drawings, in which:

Fig. 2 is a side view of the latch mechanism for the hammer shown in Fig. 1;

Fig. 3 is a schematic showing of a complete electrical and mechanical system embodying the principles of our invention;

Figure 1:
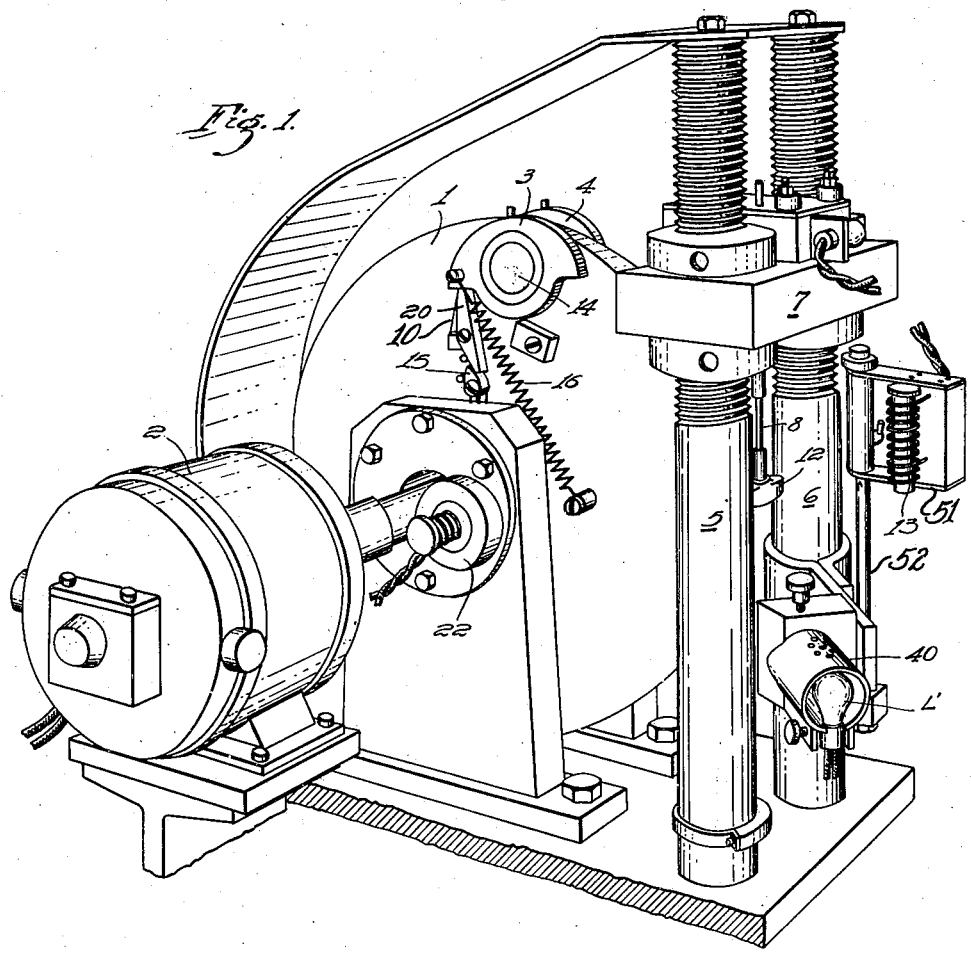
Figure 1 is a perspective view of a tensile machine embodying the principles of our invention.

Referring more particularly to the drawings, the machine shown in Figs. 1 to 3 inclusive, consists of a flywheel 1 driven by a direct-current motor 2. A pair of hammers 3, 4 are pivotally mounted on and rotate with the wheel. A pair of vertical columns 5, 6, carrying a heavy cross-piece 7 which cross-bar supports a force measuring bar 9 which in turn supports the test piece 8 in a vertical position. The force measuring bar 9, having parallel uprights or shanks made of a metal having a high elastic modulus, such as steels having high and perfect elastic properties and linear elastic stress-strain characteristics, is attached to the cross-piece 7. A cooling plug 11 through which a suitable cooling liquid flows (see Fig. 3) is placed between the bar 9 and the test specimen 8 in order to prevent over-heating of the force measuring bar when materials of high heat conductivity, such as copper and aluminum, are tested. This latter carries at its lower end an anvil 12, a short cross-piece of steel which is threaded to admit the test specimen 8. The specimen is heated by an induction furnace 13 consisting of a water-cooled copper tube wound as a helical coil which can be assembled by unscrewing the test specimen 8. The furnace 13 is mounted on a frame 51 which is pivotally supported on a shaft 52 so that the furnace may be swung into or out of its normal operating position. The force is applied to the specimen through a pair of hammers 3, 4 striking the anvil 12. The two hammers are pinned to the flywheel 1 by means of a heavy pin 14 around which they can be rotated. When a trigger 15 is released (see Fig. 2), the hammers are rotated in their striking position until they abut a stop by means of the spring 16, which is attached to the flywheel. In other words, the spring biased lever 20 (see leaf spring 10 immediately above thereof) is partially rotated so as to unlatch hammer 3 thereby moving the latter from the position shown in dotted lines to that shown in full lines. The trigger is tripped by a solenoid operated pin 21 (Fig. 2), which is actuable by means of solenoid 22 (see Fig. 1) which moves pin 21 so as to rotate trigger 15 clockwise to thus rotate lever 20 counterclockwise to thus release the hammers 3 and 4. This operation takes place at the desired moment after the flywheel has obtained full speed. The trigger, lever, and hammer are mounted for rotary motion about axes passing through their respective center of gravities. No rotary motion is thus produced on these elements during rotation of the flywheel by reason of centrifugal forces.

In operation, when the hammers hit the anvil, a force is transmitted through the specimen to the force measuring bar. The extremely small elastic extension of the force measuring bar 9 is converted into an electric current impulse (by photo-cell P and an amplifier) which is proportional to the force. The motion of the anvil is utilized for measuring the strain. When the anvil moves vertically downward, it cuts a light beam emanating from a lamp L, falling on a photoelectric cell P'. The resulting current decrease is proportional to the strain. These two current impulses are combined at right angles on the screens of a cathode ray oscilloscope 41 of any well known type, which, therefore, records the stress-strain curve.

The force measuring bar 9 is made from a solid piece of tool steel. It is devoid of movable parts, links, pivots, etc., that might transmit shocks thereto which makes ordinary mechanical extensometers impractical for our purpose. The upright sections of the measuring bar 9 transmit the load to the cross-piece 7 and their elastic deformation appears as a small change of the width of a very narrow optical slit 17. A vertical pin 18, which is welded to the bar 9, transmits the motion of the lower head of this bar to the slit 17 whose upper edge follows the motion of the upper head of the bar. Through the slit, which is of the order of 0.002 inch, a beam of light is projected which falls on the photoelectric cell. The photo-cells and light sources are mounted on rubber or other similar shock-proof supports which, in turn, are mounted on cross-piece 7.

In our experiments, the natural frequency of the lowest mode of the longitudinal oscillations of the force measuring bar was made as high as possible. This frequency was estimated to be around 15,000 cycles per second. The attachments to this bar were kept as light as possible with the intention of not reducing this frequency too much. The actual stress-strain curves showed that the lowest frequency of the system consisting of the force measuring bar, the test piece, and the anvil was of the order of 10,000 cycles per second. The duration of the fastest tests was 5 to 8 ten thousandths of a second, so that usually 5 to 6 principal vibrations appear in the fastest diagrams. It was noted that the amplitude of these oscillations increases with the speed of plastic deformation and that these disturbing oscillations were damped down fairly rapidly in many of the materials which were investigated. At peripheral speeds above 1000 inch/sec., these oscillations became seriously disturbing and it must be doubted that diagrams could successfully be recorded at much higher velocities in dynamic systems of a similar nature.

The illumination of the slit for the force measurements is shown in Fig. 3. By means of a lens, the light of a lamp L is projected uniformly over the optical slit 17. The photo-cell P, pickup, and direct-current amplifier are combined into one unit 19. A cartridge type of vacuum photo-cell was used. The force which is transmitted through the test bar stretches the two uprights of the force measuring bar, the result being that the width of narrow slit 17 is slightly increased and more light passes through it to the photo-cell P.

The response of the photo-cell is finally converted by the usual means into a voltage under whose action a cathode ray deflection is obtained on screens proportional to the acting force in the test bar.

To insure accurate and reproducible readings, the force measuring system may be calibrated before a series of tests and after it.

For the strain measurements, a second optical system with a photo-cell P' is provided, all parts of which are mounted in two coaxial brass tubes, such as 40 in Fig. 1, below the anvil. The light of a small lamp L' is converted to a parallel beam of light between two condensing lenses. Only a rectangular portion, say, about ⅜ by one inch need be utilized of the parallel beam of light. When the anvil, due to the stretching of the test specimen, moves downward, it intercepts the light and the resulting decrease of light causes a response of the photo-cell P' which is recorded as a horizontal deflection of the electron beam moving across the screen of the oscillograph 41. The strain measuring system is preferably frequently calibrated. The oscillograms appearing on the screen S can thus be photographed on a high-speed film in a camera C.

The calibration of the force measuring system is accomplished in the following manner. The grid bias of the first stage tube of the direct-current amplifier is set to give a definite current in the output circuit at meter M (Fig. 3), when the light source L has been cut off from the optical slit 17; the lamp L is now turned on and its intensity increased until the output current has been changed by a certain amount due to the light reaching the photo-cell P, through the no-load opening of the slit 17. When these no-load settings have been made, a load is applied to the force measuring bar with dead weights acting through a lever arm (not shown). The change in the output current is noted for given applied loads. From the resulting current vs. load curve, the output voltages of the direct-current amplifier can be determined for all loads. The output voltage is put into the oscillograph vertical amplifier which is an alternating-current amplifier, and must be calibrated dynamically. This is accomplished by applying known alternating-current voltages to the amplifier and measuring the resulting beam deflections. By combining the calibrations of the alternating-current and direct-current amplifiers, an overall calibration can be determined which gives the screen deflection for any applied load within the range of the calibration. The strain-measuring system is calibrated as follows. The lamp L' is set at a definite intensity to give a certain current in the photo-cell circuit, which is measured at the meter M'. A shutter, placed in the position of the anvil, is moved downward a hundredth of an inch and the resulting change in photo-cell current recorded. This is repeated until the light beam is entirely cut off. From the data obtained, the voltage produced across the photo-cell load resistor can be computed. The load resistor voltage is put into the oscilloscope horizontal amplifier which is an alternating-current amplifier. This amplifier is calibrated dynamically and in the same manner as the oscilloscope vertical amplifier. By combining the calibrations of the photo-cell circuit and of the alternating-current amplifier, an overall calibration can be computed which gives the horizontal screen deflection for any anvil displacement. In addition, the total stretch of the broken test specimen is measured and compared with a photograph record of the test.

Figures 4, 5:
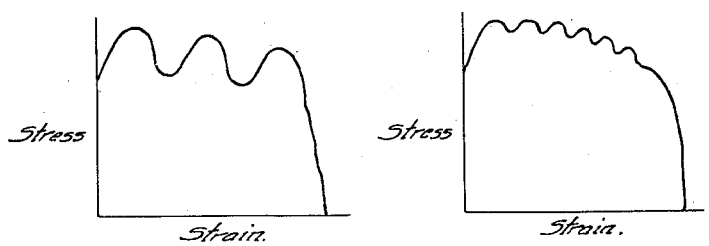
Figs. 4 and 5 are curves showing the stress-strain characteristics of a specimen under different operating conditions.

A desirable range of speed for the hammers for most high-speed loading is between 100 and 1100 inches per second. It is to be understood that our present system is not limited to such speeds. As a matter of fact, by decreasing the speed of the motor and increasing the weight of the flywheel, it is possible to gradually approximate the effect of a pendulum or dropping weight, therefore, providing a system suitable for low speed by the use of low hammer speeds. It is possible by increasing the motor speed, to get faster and faster applications of loading and greater impact forces. However, a point is soon reached when the total period required for breaking the specimen is only a few times greater than the period of the force measuring bar 9 and the attached parts. This results in a stress-strain characteristic as shown in Fig. 4, which is unsatisfactory because the wave length of the measuring bar figures too prominently in the system. By making the frequency of the system high, that is, at least 10,000 cycles per second, and by not shortening the period of breakage excessively, a stress-strain curve such as shown in Fig. 5 is obtained, which is satisfactory. Of course with higher frequencies the ripples in the curve are smoothed out more and more.

While our device has been described as a tensile machine, it will be readily apparent that it is also useful as a high-speed impact machine.

We are, of course, aware that at others, particularly after having had the benefit of the teachings of our invention, may devise other devices embodying our invention, and we, therefore, do not wish to be limited to the specific showings made in the drawing and the descriptive disclosure hereinbefore made, but wish to be limited only by the scope of the appended claims.

We claim as our invention:

1. A machine for measuring the stress-strain characteristic of a specimen at high speed, comprising, in combination, a rigid metallic body having a relatively high elastic modulus, said body having a screw-threaded opening for supporting one end of said specimen, an anvil which is in screw-threaded engagement with the other end of said specimen, a flywheel, means for rotating said flywheel, hammer means mounted on said flywheel, means for rendering said hammer means effective to strike said anvil and effect elongation of said specimen, photoelectric amplifying means for producing a current proportional to the elongation of said body which is indicative of the force acting on said body, a second photoelectric amplifying means for producing a current proportional to the elongation of said specimen, a cathode ray tube means including a screen for combining at right angles the effects of said currents to visibly produce a stress-strain curve.

2. A machine for measuring the stress-strain characteristic of a specimen at high speed, comprising, in combination, a rigid support, a rigid metallic body disposed on said support, said body having a relatively high elastic modulus and having integrally formed longitudinal shank means and having a minimum natural frequency of 10,000 cycles per second, said body having a screw-threaded opening at one end of the shank means for supporting one end of said specimen, an anvil which is in screw-threaded engagement with the other end of said specimen, a flywheel, means for rotating said flywheel, hammer means mounted on said flywheel, means for rendering said hammer means effective to strike said anvil and effect elongation of said specimen, photoelectric amplifying means for producing a current proportional to the elongation of the shank means of said body, a second photoelectric amplifying means for producing a current proportional to the elongation of said specimen, a cathode ray tube means including a screen for combining at right angles the effects of said currents to visibly produce a stress-strain curve.

3. A machine for measuring the stress-strain characteristic of a specimen at high speed, comprising, in combination, a rigid support, a rigid metallic body disposed on said support, said body having a relatively high elastic modulus and having a pair of integrally formed longitudinal shanks, said body being rigidly supported adjacent one end of said shanks and having a screw-threaded opening adjacent the other end of the shanks for supporting one end of said specimen, an anvil which is in screw-threaded engagement with the other end of said specimen, an induction heater coil surrounding said specimen and imparting heat thereto, a flywheel, means for rotating said flywheel, hammer means mounted on said flywheel, means for rendering said hammer means effective to strike said anvil and effect elongation of said specimen, photoelectric amplifying means disposed in operative relation to the shanks of said body for producing a current proportional to the elongation of said shanks, a second photoelectric amplifying means disposed in operative relation to said anvil for producing a current proportional to the elongation of said specimen, a cathode ray tube means including a screen for combining at right angles the effects of said currents to visibly produce a stress-strain curve.

4. A machine for measuring the stress-strain characteristic of a specimen at high speed, comprising, in combination, a rigid metallic body having a relatively high elastic modulus, said body having a screw-threaded opening for supporting one end of said specimen, an anvil which is in screw-threaded engagement with the other end of said specimen, an induction heater coil surrounding said specimen and imparting heat thereto, cooling means interposed between said induction heater coil and said rigid metallic body to minimize heat transfer thereto, a flywheel, means for rotating said flywheel, hammer means mounted on said flywheel, means for rendering said hammer means effective to strike said anvil and effect elongation of said specimen, photoelectric amplifying means for producing a current proportional to the elongation of said body, a second photoelectric amplifying means for producing a current proportional to the elongation of said specimen, a cathode ray tube means including a screen for combining at right angles the effects of said currents to visibly produce a stress-strain curve.

5. A machine for measuring the stress-strain characteristic of a specimen at high speed, comprising, in combination, a rigid metallic body having a relatively high elastic modulus, said body having a screw-threaded opening for supporting one end of said specimen, an anvil which is in screw-threaded engagement with the other end of said specimen, a flywheel, means for rotating said flywheel, hammer means mounted on said flywheel and being symmetrically shaped so as to be unaffected by centrifugal action of said flywheel, means for effecting angular movement of said hammer means including a spring, a latch for keeping said spring under tension, and a trigger mechanism for unlatching said latch so that the hammer partially rotates under the influence of said spring, for rendering said hammer means effective to strike said anvil and effect elongation of said specimen, photoelectric amplifying means for producing a current proportional to the elongation of said body, a second photoelectric amplifying means for producing a current proportional to the elongation of said specimen, a cathode ray tube means including a screen for combining at right angles the effects of said currents to visibly produce a stress-strain curve.

6. A machine for measuring the stress-strain characteristic of a specimen at high speeds, comprising, in combination, a rigid metallic body having a relatively high elastic modulus, said body having a screw-threaded opening for supporting one end of said specimen, an anvil which is in screw-threaded engagement with the other end of said specimen, a flywheel, means for rotating said flywheel, hammer means mounted on said flywheel, spring means for biasing said hammer means in operative relation with respect to said anvil, latching means for maintaining said hammer in inoperative relation with said hammer means, and means for unlatching said latching means for rendering said hammer means effective to strike said anvil and effect elongation of said specimen, photoelectric amplifying means including a direct-current amplifier for producing a current proportional to the elongation of said body, a second photoelectric amplifying means for producing a current proportional to the elongation of said specimen, a cathode ray tube means including a screen for combining at right angles the effects of said currents to visibly produce a stress-strain curve.

7. A force measuring device comprising, in combination, a rigid metallic body having a relatively high elastic modulus and having two longitudinal integrally formed shanks, means for rigidly supporting said body adjacent one end of said shanks, a shutter element integrally connected to said body adjacent the other end of said shanks, a light source for producing a light beam which is adapted to be intercepted by said shutter element, a photoelectric element for receiving light which is not blocked by said shutter, means for applying a force to said body at said other end of said shanks to effect elongation of said shanks of said body in a longitudinal direction and electric amplifying means including said photoelectric element for translating light variations to current variations and for amplifying the effects of said elongation by amplifying said current variations.

8. A force measuring device comprising, in combination, a rigid metallic body having a relatively high elastic modulus and having longitudinal integrally formed shanks, means for rigidly supporting said body adjacent one end of said shanks, a shutter element integrally connected to said body adjacent the other end of said shanks, a light source for producing a light beam which is adapted to be intercepted by said shutter element, a photoelectric element for receiving light which is not blocked by said shutter, means for applying a force to said body at said other end of said shanks to effect elongation of said shanks of said body in a longitudinal direction and direct current amplifying means including said photoelectric element for translating light variations to current variations and for amplifying the effects of said elongation by amplifying said current variations.

9. A force measuring device comprising, in combination, a rigid metallic body having a relatively high elastic modulus and having longitudinal integrally formed shank means and having a minimum natural frequency of 10,000 cycles per second, means for rigidly supporting said body adjacent one end of said shanks a shutter element integrally connected to said body at the other end of said shanks, a light source for producing a light beam which is adapted to be intercepted by said shutter element, a photoelectric element for receiving light which is not blocked by said shutter, means for applying a force to said body at said other end of said shanks to effect elongation of said shanks of said body in a longitudinal direction to thus alter the position of the shutter with reference to the light beam to alter the light transmitted to said photoelectric element and electric amplifying means including said photoelectric element for translating light variations to current variations and for amplifying the effects of said elongation by amplifying said current variations.

10. A machine for measuring the force applied to a specimen at high speed, comprising, in combination, a rigid metallic body having a relatively high elastic modulus and having longitudinal integrally formed shank means, means for rigidly supporting said body adjacent one end of said shanks said body having a screw-threaded opening adjacent the other end of said shanks for supporting one end of said specimen, an anvil which is in screw-threaded engagement with the other end of said specimen, a flywheel, means for rotating said flywheel, hammer means mounted on said flywheel, means for rendering said hammer means effective to strike said anvil and effect elongation of said specimen, photoelectric amplifying means for producing a current proportional to the longitudinal elongation of said shanks of said body and means for measuring said current, thereby measuring the force applied to said body.

11. A variable speed impact machine embodying a rotatable element, retractable impact members carried by said element, releasable means for holding the members retracted, a rigid metallic body having a high elastic modulus and having integrally formed longitudinal shanks, means for rigidly supporting said body adjacent one end of said shanks adjacent the rotatable element, means for securing a specimen to be deformed at a relatively high velocity to said body adjacent the other end of said shank means, means for heating the specimen to any selected temperature, and means for indicating force required to elongate the specimen, said indicating means being responsive to the elongation of said shanks of said body due to impact by said impact members.

12. A variable speed impact machine embodying a rotatable element, retractable impact members carried by said element, releasable means for holding the members retracted, a rigid metallic body having a high elastic modulus and having integrally formed longitudinal shanks, means for rigidly supporting said body adjacent one end of said shanks adjacent the rotatable element, means for securing a specimen to be deformed at a relatively high velocity to said body adjacent the other end of said shank means, an inductive heater surrounding the specimen for rapidly heating the specimen to any selected temperature, and means for indicating force required to elongate the specimen, said indicating means being responsive to the elongation of said shanks due to impact of said impact members.

ARPAD NADAI.
MICHAEL J. MANJOINE.